US010086635B2

(12) United States Patent
Fukuhara

(10) Patent No.: US 10,086,635 B2
(45) Date of Patent: Oct. 2, 2018

(54) ERASING APPARATUS AND SHEET SORTING METHOD

(71) Applicants: KABUSHIKI KAISHA TOSHIBA, Tokyo (JP); TOSHIBA TEC KABUSHIKI KAISHA, Tokyo (JP)

(72) Inventor: Takanori Fukuhara, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 14/844,329

(22) Filed: Sep. 3, 2015

(65) Prior Publication Data

US 2016/0068000 A1 Mar. 10, 2016

(30) Foreign Application Priority Data

Sep. 8, 2014 (JP) ................................ 2014-182400
Jul. 23, 2015 (JP) ................................ 2015-145747

(51) Int. Cl.
*G06K 15/00* (2006.01)
*B41M 7/00* (2006.01)

(52) U.S. Cl.
CPC ................................ *B41M 7/0009* (2013.01)

(58) Field of Classification Search
CPC .................................................. B41M 7/0009
USPC ...................................................... 358/1.14
See application file for complete search history.

(56) References Cited

U.S. PATENT DOCUMENTS

| | | | | |
|---|---|---|---|---|
| 4,907,033 | A * | 3/1990 | Maruta | G03G 15/047 399/187 |
| 5,574,538 | A * | 11/1996 | Takahashi | B41M 7/0009 347/101 |
| 8,261,916 | B2 | 9/2012 | Enomoto | |
| 8,717,633 | B2 * | 5/2014 | Tomizawa | H04N 1/00127 358/1.9 |
| 9,248,661 | B2 * | 2/2016 | Yagi | B41M 7/0009 |
| 2009/0238364 | A1 * | 9/2009 | Furukawa | H04N 1/00222 380/243 |
| 2012/0024953 | A1 * | 2/2012 | Fan | B42D 15/0073 235/454 |
| 2015/0161376 | A1 | 6/2015 | Fukuhara | |
| 2015/0183251 | A1 * | 7/2015 | Konagaya | B41M 5/305 503/201 |

FOREIGN PATENT DOCUMENTS

| | | |
|---|---|---|
| JP | 2004-243563 | 9/2004 |
| JP | 2007-251850 | 9/2007 |

* cited by examiner

*Primary Examiner* — Neil R McLean
*Assistant Examiner* — Darryl V Dottin
(74) *Attorney, Agent, or Firm* — Patterson & Sheridan, LLP

(57) ABSTRACT

In one embodiment, an erasing apparatus has a scanner, an erasing unit, a plurality of sheet discharge trays, and a processor. The processor acquires, from image data of a sheet outputted by the scanner, attribute data of the sheet. The processor controls execution propriety of erasing processing by the erasing unit, and sorting processing to discharge the sheet to the plurality of sheet discharge trays, based on the attribute data.

15 Claims, 7 Drawing Sheets

Fig.4A 1 38010 65154 4

Fig.4B

ERASING APPARATUS AND SHEET SORTING METHOD

CROSS-REFERENCE TO RELATED APPLICATION

This application is based upon and claims the benefit of priority from the prior Japanese Patent Application No. 2014-182400, filed on Sep. 8, 2014, the entire contents of which are incorporated herein by reference.

This application is also based upon and claims the benefit of priority from the prior Japanese Patent Application No. 2015-145747, filed on Jul. 23, 2015, the entire contents of which are incorporated herein by reference.

FIELD

Embodiments described herein relate generally to an erasing apparatus and a sheet sorting method in the erasing apparatus.

BACKGROUND

In recent years, an erasing apparatus which sequentially takes in a sheet on which an image is formed using decolorable coloring material, and heats the sheet while pressurizing the sheet, to perform erasing processing of the image is known. The decolorable coloring material is coloring material which is decolored by being heated at a prescribed temperature. The image which has been subjected to the erasing processing is decolored, to be erased visually. This erasing apparatus is used for the purpose of promoting reuse of a sheet. The erasing apparatus detects presence/absence of a mark indicating the limitation of number of uses of a sheet and the degree of deterioration of a sheet from the sheet, and judges whether or not the sheet is reusable based on this detection result.

However, the above-described conventional erasing apparatus executes erasing processing to a sheet of a processing object in the same manner, upon accepting an erasing request by a user, even when a sheet on which an image including an important image or a confidential image is formed is mixed in sheets of processing objects. Further, the conventional erasing apparatus does not perform processing to the sheet after the erasing processing for sorting a sheet on which an image including an important image or a confidential image has been formed and an otherwise sheet. Accordingly, the conventional erasing apparatus has a problem of security management, in a point of safe discharge of a sheet on which an image including an important image or a confidential image has been formed.

BRIEF DESCRIPTION OF THE DRAWINGS

FIG. 4A is a diagram showing an example of a bar code which is to be printed on a sheet of a processing object of the erasing apparatus according to the embodiment.

FIG. 4B is a diagram showing an example of a bar code which is to be printed on a sheet of a processing object of the erasing apparatus according to the embodiment.

DETAILED DESCRIPTION

Figure 1:
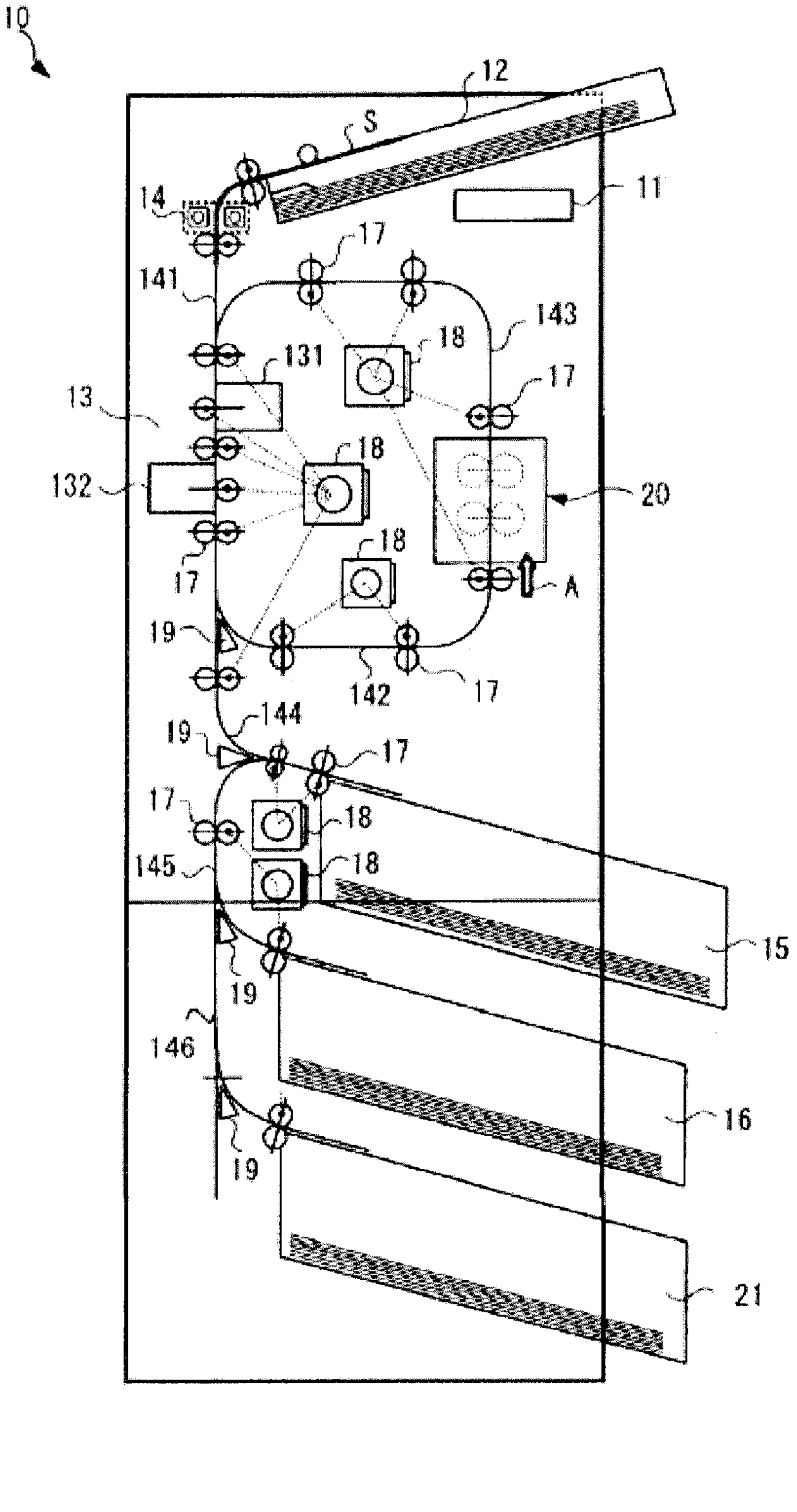
FIG. 1 is a schematic diagram showing a whole configuration example of an erasing apparatus according to an embodiment.

According to one embodiment, an erasing apparatus has a scanner, an erasing unit, a plurality of sheet discharge trays, and a processor.

The scanner scans a sheet, to output image data of the sheet.

The erasing unit erases an image formed on a sheet.

The plurality of sheet discharge trays house the sheet after scan processing by the scanner, or the sheet after erasing processing by the erasing unit.

The processor acquires attribute data of the sheet from the image data by the scanner. Further, the processor controls sorting processing to discharge the sheet to a prescribed sheet discharge tray out of the plurality of sheet discharge trays, when the processor judges that the sheet which has been subjected to the erasing processing by the erasing unit is a sheet requiring security management, based on the attribute data.

In an embodiment described later, on a sheet of a processing object by an erasing apparatus, an original image and, and a machine-readable mark are printed. The original image is an image which is printed according to a request of a used using an image forming apparatus. The mark is a bar code, for example. The bar code includes attribute data for controlling the function of the erasing apparatus according to the embodiment. The erasing apparatus of the embodiment scans a sheet of a processing object, to acquire an image of a bar code. The erasing apparatus, based on the attribute data included in the acquired bar code, safely and effectively perform sorting processing of a sheet requiring security management. The sheet requiring security management is a sheet on which an original image including an important image or a confidential image is printed, for example.

Further, the erasing apparatus of the embodiment performs sorting processing safely and effectively, based on the information of a security level which the attribute data has, so as to reuse a sheet.

Hereinafter, embodiments will specifically be described with reference to the drawings. In the drawings, the same symbols indicate the same or similar portions.

FIG. 1 is a schematic diagram showing a whole configuration example of an erasing apparatus 10 according to an embodiment. The erasing apparatus 10 has a control panel 11, a sheet feeding unit 12, a scanner 13, a sensor 14, and an erasing unit 20.

The sheet feeding unit 12 holds a sheet S that is a processing object set by a user.

The scanner 13 scans the sheet S, to output image data described later. The image data includes the above-described original image, the above-described bar code, and state information of a sheet described later. The sensor 14 is an ultrasonic sensor for detecting a conveying state of the sheet S, for example.

The erasing unit 20 decolors an original image printed on the sheet S of the processing object, for example, to visually erase the original image. Specifically, the erasing unit 20 is a heat source unit to decolor an original image printed using decolorable coloring material. The decolorable coloring material is coloring material which is decolored by being heated at a prescribed decoloring temperature.

The erasing apparatus 10 has further a conveying unit to convey a sheet. The conveying unit includes a first conveying path 141, a second conveying path 142, a third conveying path 143, a fourth conveying path 144, a fifth conveying path 145, a sixth conveying path 146.

Further, the erasing apparatus 10 has a first sheet discharge tray 15 (reuse tray), a second sheet discharge tray 16 (reject tray), a third sheet discharge tray 21 (confidential tray). The reuse tray 15, the reject tray 16, and the confidential tray 21 are a sheet discharge portion to house a sheet after sorting processing, as described later.

The above-described conveying unit has a plurality of conveying rollers 17 to convey the sheet S which are provided for each of the first to sixth conveying paths 141-146. Further, the conveying unit has a plurality of motors 18 for driving the respective conveying rollers 17. Further, the conveying unit has a plurality of gates 19 which are respectively provided at a branch point where the second conveying path 142 and the fourth conveying path 144 branch from the first conveying path 141, a branch point where the fifth conveying path 145 branches from the fourth conveying path 144, and a branch point where the sixth conveying path 146 branches from the fifth conveying path 144. Each of the plurality of gates 19 changes the conveying direction of the sheet S at the branch point for guiding the sheet S to each of the conveying paths 141-146.

The first conveying path 141 conveys the sheet S from the sheet feeding unit 12 to the scanner 13.

The second conveying path 142 is provided so as to branch from the first conveying path 141. The second conveying path 142 conveys the sheet S conveyed from the scanner 13 through the first conveying path 141 and the gate 19 to the erasing unit 20 (refer to an arrow A).

The third conveying path 143 is provided so as to merge with the first conveying path 141. The third conveying path 143 conveys the sheet S again from the erasing unit 20 to the scanner 13.

The fourth conveying path 144 is provided so as to branch from the first conveying path 141. The fourth conveying path 144 conveys the sheet S conveyed from the scanner 13 through the first conveying path 141 and the gate 19 to the reuse tray 15.

The fifth conveying path 145 is provided so as to branch from the fourth conveying path 144. The fifth conveying path 145 conveys the sheet S conveyed from the scanner 13 through the first conveying path 141, the fourth conveying path 144 and the gate 19 to the reject tray 16.

The sixth conveying path 146 is provided so as to branch from the fifth conveying path 145. The sixth conveying path 146 conveys the sheet S conveyed from the scanner 13 through the first conveying path 141, the fourth conveying path 144, the fifth conveying path 145 and the gate 19 to the confidential tray 21.

The reuse tray 15 houses the sheet S which has been determined to be reusable, after subjected to the erasing processing by the erasing unit 20, for example.

The reject tray 16 houses the sheet S which has been determined to be unreusable and is to be recycled by normal disposal.

The confidential tray 21 houses the sheet S which is determined to require security management.

The erasing apparatus 10 generally performs following operations (1)-(5).

(1) The erasing apparatus 10 performs scan processing of a sheet before erasing processing.

That is, the erasing apparatus 10 conveys the sheet S fed from the sheet feeding unit 12 via the first conveying path 141 to the scanner 13.

The scanner 13 includes a first scanner 131 and a second scanner 132. The scanner 13 scans the both surface of the sheet S before erasing processing of the sheet S, for example, to output image data. The image data includes the above-described original image, the above-described bar code, and sheet state information described later. Accordingly, the erasing apparatus 10 can acquire the above-described original image, and the above-described bar code, before erasing processing of the sheet S, for example. The erasing apparatus 10 can acquire the state information of a sheet in parallel. The state information of a sheet is information and so on indicating a state of break or wrinkle of the sheet S, for example. The state information of a sheet further includes information indicating printing state, such as a printing rate, of the sheet S.

(2) The erasing apparatus 10 performs storage processing of the image data acquired using the scanner 13.

Further, the erasing apparatus 10 judges whether break, wrinkle or the like is present in the sheet S, from the state information of a sheet acquired using the scanner 13, and performs a first sorting processing of the sheet S based on the judgement result.

That is, when break of wrinkle is present in the sheet S, the erasing apparatus 10 leads the sheet S from the scanner 13 to the fifth conveying path 145 using the gate 19, and conveys the sheet S to the reject tray 16 by the fifth conveying path 145.

When break of wrinkle is not present in the sheet S, the erasing apparatus 10 leads the sheet S from the scanner 13 to the second conveying path 142, and conveys the sheet S to the erasing unit 20 by the second conveying path 142.

In addition, the erasing apparatus 10 acquires the above-described bar code, based on the image data outputted by the scanner 13. The erasing apparatus 10 performs a further sorting processing, based on the above-described attribute data included in the bar code.

That is, the erasing apparatus 10 judges whether or not the sheet S is a sheet which requires security management, and whether or not the setting not to perform the erasing processing has been made. When the sheet S is a sheet which requires the security management, and the setting not to perform the erasing processing has been made, the erasing apparatus 10 leads the sheet S from the scanner 13 to the sixth conveying path 146 using the gate 19, and conveys the sheet S to the confidential try 21 by the sixth conveying path 146.

In addition, the above-described erasing processing may be executed, not based on the attribute data, but based on the previously stored setting, for example, or the selection by a user.

(3) The erasing apparatus 10 performs erasing processing of an image formed on the sheet S, using the erasing unit 20.

The erasing unit 20 heats and pressurizes the sheet S at a relatively high erasing temperature of 180-200° C., for example, in order to erase an original image formed on the sheet S.

(4) The erasing apparatus 10 performs scan processing again after the erasing processing.

That is, the erasing apparatus 10 conveys again the sheet S after the erasing processing by the erasing unit 20 to the scanner 13 via the third conveying path 143. The erasing apparatus 10 scans again the sheet S after the erasing processing using the scanner 13, in order to confirm whether or not the original image which has been printed in an image area of the sheet S using decolorable coloring material has been surely erased. The scanner 13 outputs the image data of the sheet S after the erasing processing.

(5) The erasing apparatus 10 performs a final sorting processing of the sheet S, based on the image data of the sheet S after the erasing processing which is outputted from the scanner 13.

That is, the erasing apparatus judges whether or not the sheet S after the erasing processing is reusable. The erasing apparatus 10 judges that the sheet S after the erasing processing is reusable, when the original image has been surely erased, and break or wrinkle is not generated in the sheet S. The erasing apparatus 10 judges that the sheet S after the erasing processing is unreusable, when the original image formed using non-decolorable coloring material, or an image by handwriting by a user remains. The erasing apparatus further judges that the sheet S after the erasing processing is unreusable, when break of wrinkle is generated in the sheet S.

The erasing apparatus 10 conveys the reusable sheet S to the reuse tray 15 via the fourth conveying path 144.

The erasing apparatus 10 conveys the unreusable sheet S to the reject tray 16 via the fifth conveying path 145.

The erasing apparatus 10 leads the sheet S after the erasing processing to the sixth conveying path 146 when the sheet S is a sheet which requires security management, and conveys the sheet S after the erasing processing to the confidential tray 21.

Figure 2:
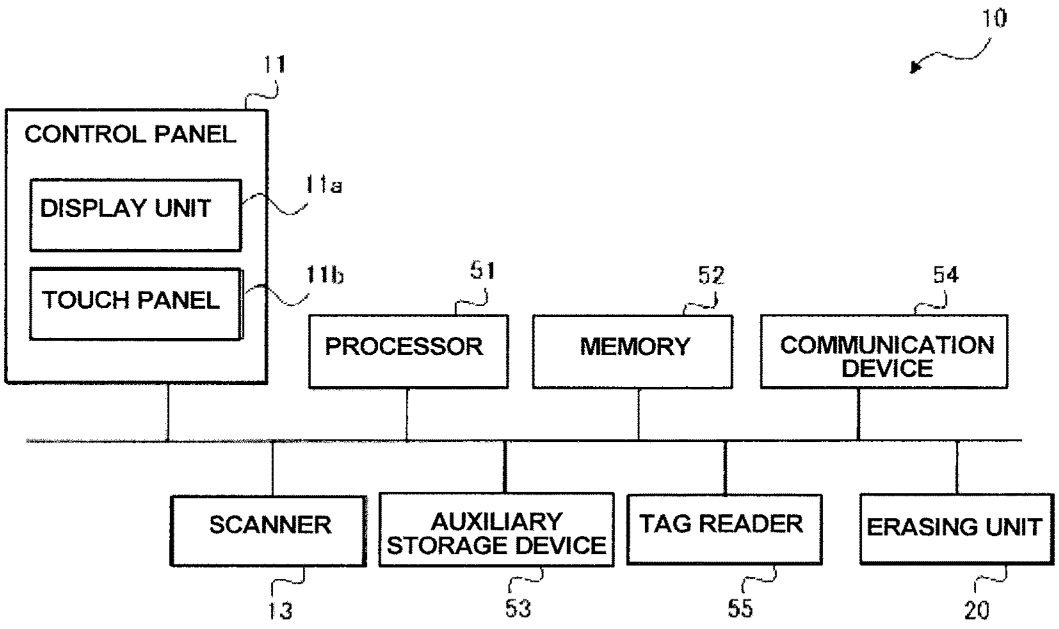
FIG. 2 is a diagram showing a hardware configuration example of the erasing apparatus according to the embodiment.

FIG. 2 is a diagram showing a hardware configuration example of the erasing apparatus 10. The erasing apparatus 10 has a processor 51, a memory 52, an auxiliary storage device 53, a communication device 54, a tag reader 55, and the control panel 11, in addition to the scanner 13, the erasing unit 20 which are described above.

The processor 51 is a CPU (Central Processing Unit) which executes a program, to totally control the operation of the erasing apparatus 10. The number of the CPUs which the erasing apparatus 10 has is not limited to be singular. A plurality of the CPUs execute a plurality of programs in parallel, and thereby may control the operation of the erasing apparatus 10.

The memory 52 includes a read only ROM (Read Only Memory) which stores a fundamental program for functioning the computer and an environment file and so on. The memory 52 includes a RAM (Random Access Memory) which stores the program which the processor 51 executes, and data necessary for the execution of each program.

The auxiliary storage device 53 is a storage device such as an HDD (Hard Disk Drive). The auxiliary storage device 53 stores data relating to the state of use of the erasing apparatus 10, and the image data outputted from the scanner 13, as the backup of the original image of the sheet S before the erasing processing. Further, the auxiliary storage device 53 stores a program which operates in a control system of the erasing apparatus 10, and its setting data and so on.

The communication device 54 transmits and receives information between the erasing apparatus 10 and a host computer to be connected to the erasing apparatus 10 via a network, and an MFP (Multifunction Peripheral) 30 described later and so on.

The tag reader 55 is a device which reads the user information recorded in an IC tag which a user possesses by wireless communication. The erasing apparatus 10 uses this user information, and thereby can perform control of erasing processing described later and so on, also for each user unit.

The control panel 11 is an output device having a display unit 11*a* and a touch panel 11*b*. The display unit 11*a* displays a function menu and so on which the erasing apparatus 10 has. The touch panel 11*b* is an input unit which accepts an input such as an erasing request by a user.

The scanner 13 optically scans the sheet S, for example. The scanner 13 scans the sheet S of the processing object, to output the image data of the sheet S.

Figure 3:
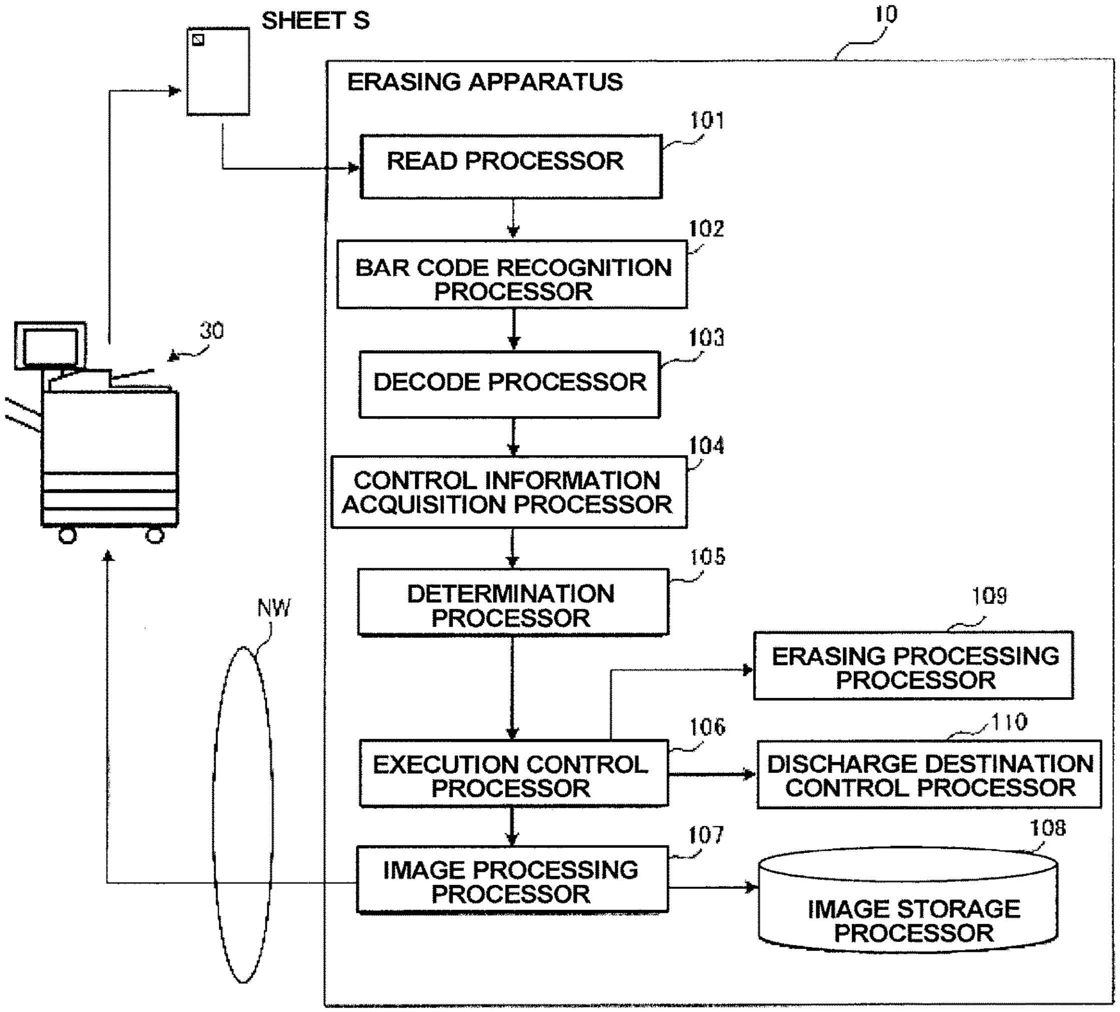
FIG. 3 is a block diagram showing functions which the erasing apparatus according to the embodiment has.

FIG. 3 is a block diagram showing functions which the erasing apparatus 10 has.

The processor 51 of the erasing apparatus 10 has a read processor 101, a bar code recognition processor 102, a decode processor 103, a control information acquisition processor 104, an execution propriety determination processor 105, an execution control processor 106, an image processing processor 107, an image storage processor 108, an erasing processing processor 109, and a discharge destination control processor 110.

The processor 51 reads the program stored in the ROM or the auxiliary storage device 53 into the RAM, and executes the relevant program, to function as the above-described processors 101-110 which control the respective hardwares of the erasing apparatus 10.

The read processor 101 controls the scanner 13, so as to optically scan the sheet S on which an original image is printed with decolorable coloring material, using the scanner 13.

The bar code recognition processor 102 compares the specification information of the bar code which is previously stored in a memory area of the memory 52, for example, with the above-described image data outputted from the scanner 13. The bar code recognition processor 102 recognizes the above-described bar code included in the image data, by this comparison result. The bar code recognition processor 102 has a function to search a print position of the bar code in the sheet S, for example. Accordingly, the print position of the bar code in the sheet S may be optional.

The decode processor 103 decodes the bar code recognized by the bar code recognition processor 102, and outputs the attribute data of the sheet S.

Here, the above-described bar code and the above-described attribute data will be described. FIG. 4A and FIG. 4B are diagrams each showing a bar code. The bar code is a machine-readable code. In the present embodiment, a two-dimensional bar code capable of storing several K bytes shown in FIG. 4A is employed, as the bar code.

In addition, the erasing apparatus 10 according to the present embodiment has only to acquire information and so on relating to propriety of the erasing processing from a mark printed on a sheet. Accordingly, the bar code as the above-described mark may be a one-dimensional bar code shown in FIG. 4B. Further, the above-described mark may be a prescribed symbol or image instead of the bar code. In addition, the above-described mark may be characters indicating that security management is required, such as "Confidential", or "Secret". In such a case, the decode processor recognizes the characters with character recognition technology, compares the characters with previously stored data, judges whether or not security management is required, and outputs attribute data corresponding to the judgement result.

The above-described bar code is printed on the sheet S of the processing object to be set in the sheet feeding unit 12 by a user.

Figure 5:
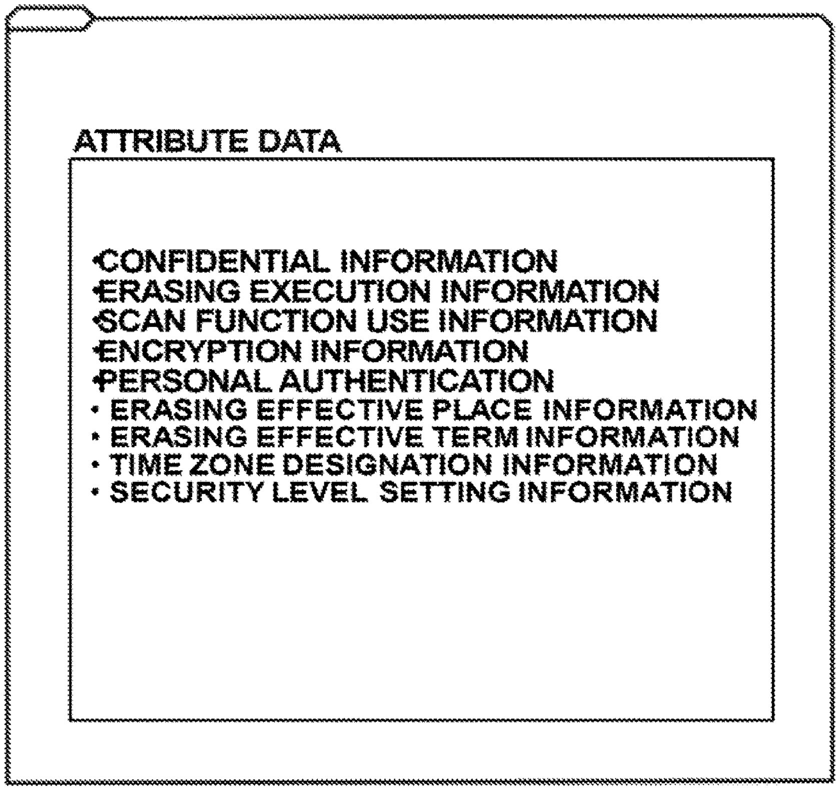
FIG. 5 is a diagram showing an example of attribute data included in the bar code shown in FIG. 4A or FIG. 4B.

FIG. 5 is a diagram for explaining attribute data of the sheet S included in the bar code.

The attribute data has, as control information relating to security management of the sheet S, control information for controlling execution propriety of the erasing processing by the erasing unit 20 of the erasing apparatus 10, control information for controlling execution propriety of the storage processing of the image data outputted from the scanner 13, and control information for determining a discharge destination tray of the sheet S.

Each control information which the attribute data has will be specifically described, with reference to FIG. 5.

Confidential information is control information which indicates whether or not the sheet S is a sheet on which a confidential image is formed. When the sheet S is a sheet on which a confidential image is formed, the confidential information includes information of “0”, for example. When the sheet S is not a sheet on which a confidential image is formed, the confidential information includes information of “1”, for example. In addition, the confidential information called here is determined based on a judgment of a user. Accordingly, the confidential information may include an important image and so on. In addition, the confidential information is not limited to the above-described information, but may be information of a discharge destination indicating whether or not to discharge the sheet S to the confidential tray 21, for example.

Erasing execution information is control information in which execution propriety of the erasing processing is defined.

When the erasing processing is executable, the erasing execution information includes information of “0”, for example. When the erasing execution is non-executable, the erasing execution information includes information of “1”, for example.

Scan function use information is control information in which execution propriety of the storage processing of the above-described image data is defined.

When the storage processing of the image data is executable, the scan function use information includes information of “0”, for example. When the storage processing of the image data is non-executable, the scan function use information includes information of “1”, for example.

Encryption information is control information in which at the time of performing the storage processing of the above-described image data, whether to perform the storage processing of the above-described image data after performing the encryption processing or to perform the storage processing of the above-described image data without change without performing the encryption processing is defined. When it is not necessary to perform the encryption processing of the above-described image data, the encryption information includes information of “0”, for example. When it is necessary to perform the encryption processing of the image data, the encryption information includes information of “1”, for example. In addition, the encryption information includes DES (Data Encryption Standard), AES (Advanced Encryption Standard) and so on, as the classification information of encryption. Further, the encryption information may include an encryption key itself.

Personal authentication information is information for identifying a user who has printed the above-described original image of the sheet S of the processing object by the erasing apparatus 10

Erasing effective place information is information in which a place where the erasing processing can be performed by the erasing apparatus 10 is indicated. When the erasing apparatus 10 is installed at each floor in a building, for example, a user can perform an operation such that the erasing processing can be performed only in the erasing apparatus at a designated floor, and the erasing processing cannot be performed at the other floors. The erasing effective place information includes a floor number value (when the erasing processing can be performed at a fifth-floor, the value is “5”) of a floor where the erasing processing can be performed, for example. In other words, the erasing effective place information has only to specify an erasing apparatus which can perform the erasing processing. Accordingly, the erasing effective place information may include identification information of an erasing apparatus which can perform the erasing processing, in place of the floor number value of a floor.

The above-described six information is fundamental control information of the erasing apparatus 10 according to the present embodiment. The above-described six information are default values when the MFP 30 according to the present embodiment performs the printing processing, or information designated by a user when the MFP 30 performs the printing processing.

The attribute data included in the above-described bar code further includes erasing effective term designation information, time zone designation information, and security level setting information shown in FIG. 5, in addition to the above-described fundamental control information.

The erasing effective term information is date information for limiting the erasing processing by the erasing apparatus 10. For example, when a day when the erasing processing is performed passes the date designated in the erasing effective term information, the erasing apparatus 10 controls the erasing unit 20 so as to perform the erasing processing. When a day when the erasing processing is performed does not pass the date designated in the erasing effective term information, the erasing apparatus 10 controls the erasing unit 20 so as not to perform the erasing processing. Conversely, when a day when the erasing processing is performed passes the date designated in the erasing effective term information, the erasing apparatus 10 may control the erasing unit 20 so as not to perform erasing processing. Further, when a day when the erasing processing is performed does not pass the date designated in the erasing effective term information, the erasing apparatus 10 may control the erasing unit 20 so as to perform erasing processing.

The time zone designation information is time information in which a time zone when the erasing processing by the erasing apparatus 10 can be performed is designated.

For example, the erasing apparatus 10 controls the erasing unit 20 so as to execute the erasing processing only in the case that a time when the erasing processing is performed is within the time designated in the time zone designation information. Conversely, the erasing apparatus 10 may control the erasing unit 20 so as not to execute the erasing processing only in the case that a time when the erasing processing is performed is within the time designated in the time zone designation information.

The security level setting information is control information in which a level value in accordance with the necessity of security management of the sheet S of the processing object is designated. In the present embodiment, it is possible to designate level values “1”-“4”, for example. For example, the level value “1” is designated as a level of low necessity of security management, and the level value “4” is designated as a level of high necessity of security management. The specific content of the security level and a processing example by the erasing apparatus 10 in accordance with the security level will be described later.

The above-described erasing effective term information, the time zone designation information, and the security level setting information are mainly designated by a user at the printing processing time of the MFP 30, but may be set as default.

The control information acquisition processor 104 acquires the above-described control information relating to the security management of the sheet S, from the above-described attribute data outputted by the decode processor 103.

The execution propriety determination processor 105 determines, based on the control information acquired by the control information acquisition processor 104, the execution propriety of the erasing processing to the sheet S, the execution propriety of the storage processing of the above-described image data, and a discharge destination tray for the sorting processing of the sheet S. The execution propriety determination processor 105 outputs this determination result to the execution control processor 106. The detail of the determination processing by the execution propriety determination processor 105 will be described later.

The execution control processor 106 controls, based on the result determined by the execution propriety determination processor 105, execution of the functions of the erasing processing, the storage processing of the image data, and the sorting processing, and so on.

For example, the execution control processor 106 instructs the image processing processor 107 so that the storage processing of the above-described image data is executed, when it is determined by the execution propriety determination processor 105 that the storage processing of the above-described image data is executable.

The image processing processor 107 outputs the above-described image data to the image storage processor 108, or the MFP 30. Further, the image processing processor 107 has an encryption function of the above-described image data. The image processing processor 107 performs the encryption processing of the above-described image data, when it is determined by the execution propriety determination processor 105 that the encryption processing of the above-described image data is necessary, and then outputs the encrypted image data to the image storage processor 108, or the MFP 30. As will be described later, for example, when a high level value is designated in the above-described security level setting information, the image processing processor 107 performs the encryption processing of the above-described image data.

The image storage processor 108 stores the above-described image data outputted by the image processing processor 107 in the auxiliary storage device 53. The scan image storage processor 108 may include a storage device to store the scan image data. As described above, when the above-described image data is outputted to the MFP 30 by the image processing processor 107, the MFP 30 stores the above-described image data in an own folder and so on.

For example, the execution control processor 106 instructs the erasing processing processor 109, so that the above-described erasing processing is executed, when it is determined by the execution propriety determination processor 105 that the above-described erasing processing is executable.

The erasing processing processor 109 controls the erasing unit 20, so as to make the erasing unit 20 execute the erasing processing.

For example, the execution control processor 106 determines, when a sheet discharge tray to which the sheet S is to be discharged is determined by the execution propriety determination processor 105, the discharge tray of the discharge destination, and instructs the discharge destination control processor 110, so that the sheet S is discharged to the determined sheet discharge tray.

The discharge destination control processor 110 controls the motor 18 and the gate 19, in accordance with the information of the sheet discharge tray determined by the execution control processor 106. The discharge destination control processor 110 controls the motor 18 and the gate 19, to make each conveying path 141-146 operate, and to make the sheet S to be discharged to any discharge tray.

Figure 6:
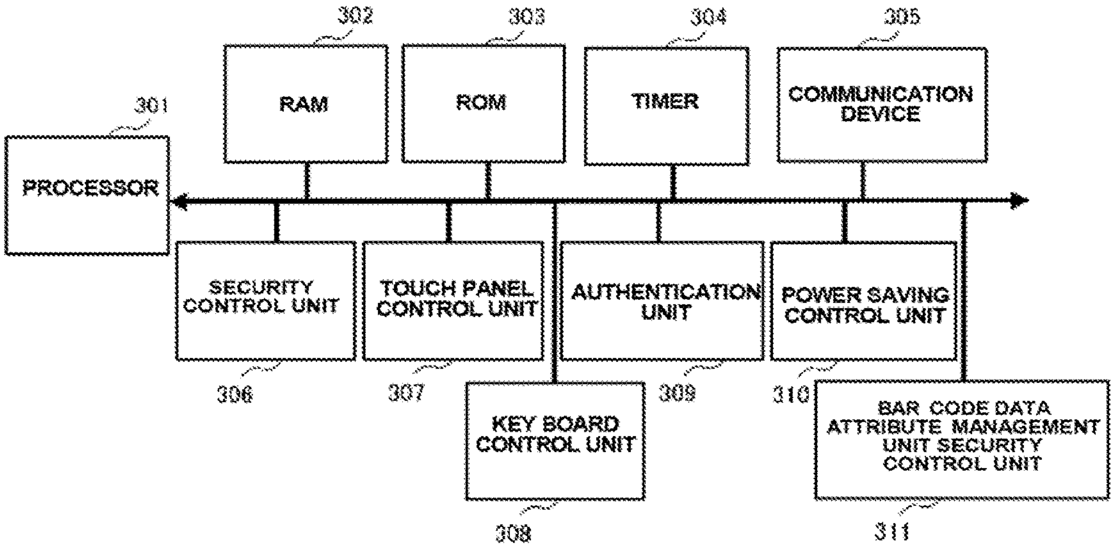
FIG. 6 is a diagram showing a configuration example of an image forming apparatus according to the embodiment.

FIG. 6 is a diagram showing a configuration example of the MFP 30 which prints the above-described original image and the above-described bar code on a sheet.

The MFP 30 has a processor 301, a RAM 302, a ROM 303, a timer 304, a communication device 305, a security control unit 306, a touch panel control unit 307, a key board control unit 308, an authentication unit 309, a power saving control unit 310, a bar code data attribute management unit 311. The processor 301, the RAM 302, the ROM 303, and the communication device 305 are units having the same functions as the constituting units 51, 52, 54 of the above-described erasing apparatus 10, respectively.

The timer 304 is a unit which counts present date and time. The erasing effective term information of the attribute data shown in FIG. 5 is defined based on the date counted by the timer 304.

The security control unit 306 is a unit which generates a classification of the above-described encryption processing and an encryption key.

The touch panel control unit 307 is a unit which includes an operation touch panel display and a display controller, of the MFP 30.

The key board control unit 308 is a unit which includes a physical key such as a numeric keypad and a controller to detect pressing of the physical key by a user.

The authentication unit 309 is a unit which stores a user ID, a password, an IC card number and so on in association, as the identification information of a user, and controls whether or not to permit the user's use, using these identification information of the user.

When performing the printing processing, the MFP 30 makes identification information of a user to be included in the above-described bar code, as the personal authentication information which the attribute data of FIG. 5 has.

The power saving control unit 310 is a unit which controls switching and return to the power saving mode in the MFP 30.

The bar code data attribute management unit 311 is a unit which converts the default value or the attribute data obtained by the user designation into a bar code, when the MFP 30 performs printing.

Figure 7:
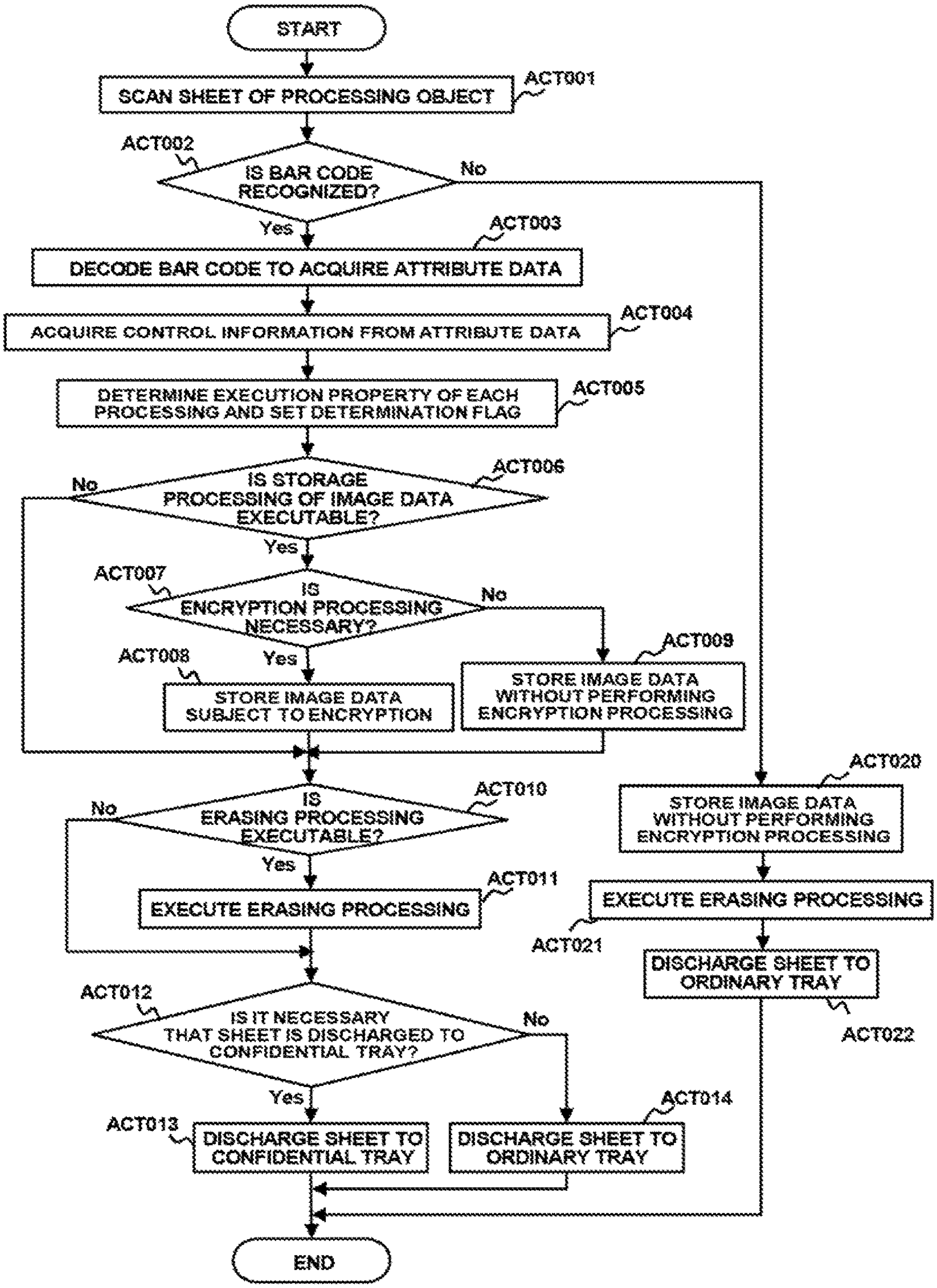
FIG. 7 is a flow chart showing an operation example of the erasing apparatus according to the embodiment.

Hereinafter, a control method relating to security management of the erasing apparatus 10, and a sorting processing method of a sheet will be described. FIG. 7 is a flow chart showing a processing example of the erasing apparatus 10 shown in FIG. 3.

As shown in FIG. 7, in Act001, the read processor 101 scans the sheet S using the scanner 13, in order to read an image formed on the sheet S of the processing object. The read processor 101 scans the sheet S, to acquire image data of the sheet S.

After scanning of the above-described sheet, the processing of the erasing apparatus 10 proceeds to Act002.

In Act002, the bar code recognition processor 102 recognizes a bar code printed on the sheet, based on the above-described image data. That is, the bar code recognition processor 102 determines presence/absence of the above-described bar code (the bar code shown in FIG. 4A, for example) in the sheet S of the processing object. Here, when having recognized the bar code (Yes in Act002), the bar code recognition processor 102 outputs the bar code to the decode processor 103. When the bar code recognition processor 102 outputs the bar code to the decode processor 103, the processing of the erasing apparatus 10 proceed to Act003. On the other hand, when having not recognized the bar code (No in Act002), the bar code recognition processor 102 assumes the sheet S of the processing object, as a sheet with the security management level which does not cause a problem even when the erasing processing is performed. Accordingly, the processing of the erasing apparatus 10 proceeds to Act020.

In Act003, the decode processor 103 decodes the bar code which is recognized by the bar code recognition processor 102, and outputs the attribute data of the sheet S shown in FIG. 5 to the control information acquisition processor 104. After the attribute data of the sheet S is outputted by the decode processor 103, the processing of the erasing apparatus 10 proceeds to Act004.

In Act004, the control information acquisition processor 104 acquires the control information (refer to FIG. 5) relating to the security management of a sheet, from the attribute data outputted by the decode processor 103. The control information acquisition processor 104 outputs the acquired control information to the execution propriety determination processor 105. After the control information is outputted by the control information acquisition processor 104, the processing of the erasing apparatus 10 proceeds to Act005.

In Act005, and set determination flag), the execution propriety determination processor 105 determines, based on the above-described control information, execution propriety of the erasing processing, and execution propriety of the storage processing of the above-described image data, or a discharge destination tray for sorting processing of the sheet S, and so on.

Here, a specific operation of the execution propriety determination processor 105 in Act005 will be described. The execution propriety determination processor 105 includes flag areas to set following four flags to indicate the above-described determination results.

A tray flag which indicates to what tray the sheet S is to be discharged

An erasing flag which indicates whether or not to execute the erasing processing A scan flag which indicates whether or not to execute the storage processing of the image data An encryption flag which indicates whether or not to perform the encryption processing of the image data A tray flag value is set to “0”, for example, when it is defined that the sheet S is discharged to the confidential tray 21, and is set to “1”, when it is defined that the sheet S is discharged to an ordinary tray except the confidential tray 21.

An erasing flag value is set to “0”, for example, when the erasing processing is executable, and is set to “1”, for example, when the erasing processing is non-executable.

A scan flag value is set to “0”, for example, when the storage processing of the image data is executable, and is set to “1”, for example, when the storage processing of the image data is non-executable.

An encryption flag value is set to “1”, for example, when the encryption processing of the image data is necessary, and is set to “0”, for example, when the encryption processing of the image data is unnecessary.

To begin with, the execution propriety determination processor 105 initializes these four flag values, based on the following four control information included in the attribute data.

The confidential information

The erasing execution information the scan function use information

The encryption information

For example, the execution propriety determination processor 105 initializes the tray flag value to the above-described “0”, when the confidential information includes the information of the above-described “0”, and initializes the tray flag value to the above-described “1”, when the confidential information includes the information of the above-described “1”.

The execution propriety determination processor 105 initializes the erasing flag value to the above-described “0”, when the erasing execution information includes the information of the above-described “0”, and initializes the erasing flag value to the above-described “1”, when the erasing execution information includes the information of the above-described “0”.

The execution propriety determination processor 105 initializes the scan flag value to the above-described “0”, when the scan function use information includes the information of the above-described “0”, and initializes the scan flag value to the above-described “1”, when the scan function use information includes the information of the above-described “1”.

The execution propriety determination processor 105 initializes the encryption flag value to the above-described “0”, when the encryption information includes the information of the above-described “0”, and initializes the encryption flag value to the above-described “1”, when the encryption information includes the information of the above-described “1”.

After initialization of the above-described flag values, the execution propriety determination processor 105 further rewrites each flag value in the following order.

1. When the execution propriety determination processor 105 judges that the personal authentication information coincides with a login user of the erasing apparatus 10, the execution propriety determination processor 105 rewrites the erasing flag value to the above-described “0” so that the erasing processing becomes executable.

2. When the erasing effective place information coincides with the identification information of the installation place which is set in the erasing apparatus 10, the execution propriety determination processor 105 rewrites the erasing flag value to the above-described “0”, so that the erasing processing becomes executable.

3. When the present date and time is larger than the value of the erasing effective term information (when passed), the execution propriety determination processor 105 rewrites the erasing flag value to the above-described “0”, so that the erasing processing becomes executable.

4. When the present time is within the time zone indicated in the time zone designation information, the execution propriety determination processor 105 rewrites the erasing flag value to the above-described “0”, so that the erasing processing becomes executable.

5. The execution propriety determination processor 105 further rewrites the values of the tray flag, the erasing flag, the scan flag, and the encryption flag, in accordance with the level value which is designated in the security level setting information.

For example, when the level value which is designated in the security level setting information is "1", the execution propriety determination processor 105 does not rewrite the above-described four flag values. That is, the flag value which has been rewritten in the above-described order 1-4 is maintained.

When the level value which is designated in the security level setting information is "2", the execution propriety determination processor 105 rewrites the tray flag value to the above-described "0", the erasing flag value to the above-described "0", the scan flag value to the above-described "0", the encryption flag value to the above-described "0".

When the level value which is designated in the security level setting information is "3", the execution propriety determination processor 105 rewrites the tray flag value to the above-described "0", the erasing flag value to the above-described "1", the scan flag value to the above-described "0", the encryption flag value to the above-described "1".

When the level value which is designated in the security level setting information is "4", the execution propriety determination processor 105 rewrites the tray flag value to the above-described "0", the erasing flag value to the above-described "1", the scan flag value to the above-described "1".

When the level value which is designated in the security level setting information is "4", since the erasing apparatus 10 does not execute the storage processing of the image data, it ignores the encryption flag value. Accordingly, the execution propriety determination processor 105 does not rewrite the encryption flag value.

In addition, the reason why the erasing processing is prohibited, when the above-described security level value is high is because even when the image has been erased by heating, the erased image might be developed, when the relevant sheet is exposed under the low temperature environment.

Further, when the erasing processing is executed, a user becomes unable to perform judgement whether or not a confidential image has been included in an original image printed on the relevant sheet. Accordingly, when the above-described security level value is not less than "3", for example, the erasing apparatus 10 does not execute the erasing processing, and discharges the sheet S to the confidential tray 21 in the unchanged state. That is, the erasing apparatus 10 can leave the sheet S on which an original image including a confidential image has been printed, as an original sheet. Further, a user can confirm that a confidential image has been included in an original image printed on the sheet S, after the sheet S has been discharged from the erasing apparatus 10.

In the processing of the order of the above-described 1, as described above, the execution propriety determination processor 105, when the personal authentication information coincides with the login user of the erasing apparatus 10, rewrites the erasing flag value so as to become a value in which the erasing processing is executed, as described above.

On the other hand, when the security level value is "4" in the processing of the order of the above-described 5, the execution propriety determination processor 105 further rewrites the erasing flag value so as to become a value in which the erasing processing is not executed.

As a result of rewriting the erasing flag value, the erasing apparatus 10 controls the erasing unit 20 so as not to execute the erasing processing.

In the processing which are to be performed in the order of the above-described 1 to 5, the execution propriety determination processor 105 rewrites the flag value at the time of processing of the precedent order, at the time of processing of the subsequent order, as in this manner, and thereby cancels the flag value at the time of processing of the precedent order, and makes the flag value at the time of processing of the subsequent order effective.

In addition, the order of the above-described 1 to 5 is only an example, and a user can designate an order of the rewriting processing of the flag value to the erasing apparatus 10.

As an aspect, the rewriting processing of the flag value based on the control information of a high importance may be made to be a processing of the subsequent order. For example, when a user thinks it most important to control whether or not to perform the erasing processing, in accordance with the personal authentication, the user designates the rewriting processing of the erasing flag value based on the personal authentication information to a processing of the final order. Accordingly, the erasing apparatus can perform the rewriting processing of the flag value based on the control information, in accordance with an order which a user designates.

The execution propriety determination processor 105 outputs each flag value which has been rewritten as described above to the execution control processor 106. After the above-described flag values are outputted by the execution propriety determination processor 105, the processing of the erasing apparatus 10 proceeds to Act 006.

In Act006, the execution control processor 106 judges whether or not the scan flag value is a value "0" indicating that the storage processing of the image data is executable.

When the scan flag value is the above-described "0" (Yes in Act006), the processing of the erasing apparatus 10 proceeds to Act007.

On the other hand, when the scan flag value is a value "1" indicating that the storage processing of the image data is non-executable (No in Act006), the processing of the erasing apparatus 10 proceeds to Act010.

In Act007, the execution control processor 106 further judges whether or not the encryption flag value is a value "1" indicating that the encryption processing of the image data is necessary. When the encryption flag value is the above-described "1" (Yes in Act007), the processing of the erasing apparatus 10 proceeds to Act008. In Act008, the execution control processor 106 instructs the image processing processor 107 so that the image data subjected to the encryption processing is stored in the erasing apparatus 10, for example. The image processing processor 107 performs the encryption processing of the image data, in accordance with the instruction of the execution control processor 106, and outputs the image data subjected to the encryption processing to the image storage processor 108. The image storage processor 108 stores the image data subjected to the encryption processing in the auxiliary storage device 53, for example. When the encryption flag value is a value indicating that the encryption processing of the image data is unnecessary (No in Act007), the processing of the erasing apparatus 10 proceeds to Act009. In Act009, the execution control processor 106 instructs the scan processing processor 107 to store the image data in the erasing apparatus 10, for example, without performing the encryption processing. The scan processing processor 107 outputs the scan image data to the image storage processor 108 without performing encryption, in accordance with the instruction of the execution control processor 106. The image storage processor 108 stores the image data which is not encrypted in the auxiliary storage device 53, for example.

In Act010, the execution control processor 106 further judges whether or not the erasing flag value is a value "0" indicating that the erasing processing is executable. When the erasing flag value is the above-described "0" (Yes in Act010), the processing of the erasing apparatus 10 proceeds to Act011. In Act011, the execution control processor 106 instructs the erasing processing processor 109, so that the erasing processing is executed to the relevant sheet S. The erasing processing processor 109 makes the erasing unit 20 execute the erasing processing, in accordance with the instruction of the execution control processor 106. On the other hand, when the erasing flag value is a value "1" indicating that the erasing processing is non-executable (No in Act010) the processing of the erasing apparatus 10 skips Act011 and proceeds to Act012.

In Act012, whether or not the tray flag value is a value "0" indicating that the sheet S is discharged to the confidential tray is further judged. When the tray flag value is "0" (Yes in Act012), the processing of the erasing apparatus 10 proceeds to Act013. In Act013, the execution control processor 106 instructs the discharge destination control processor 110, so that the relevant sheet is discharged to the confidential tray 21. On the other hand, when the tray flag value is a value "1" indicating that the sheet S is discharged to the ordinary tray except the confidential tray 21 (No in Act012), the processing of the erasing apparatus 10 proceeds to Act014. In Act014, the execution control processor 106 instructs the discharge destination control processor 110, so that the relevant sheet is discharged to the ordinary tray. In addition, the ordinary tray is a reuse tray 15, when the relevant sheet S is subjected to the erasing processing and becomes a reusable sheet. The ordinary tray is the reject tray 16, when the relevant sheet S becomes non-reusable after being subjected to the erasing processing.

When the sheet is discharged in Act013, Act014, or Act022 described later, the processing of the erasing apparatus 10 to a sheet is finished. In addition, when a plurality of the sheets S are set in the sheet feeding unit 12, the next sheet is conveyed to the first conveying path 141, and the processing of the erasing apparatus 10 returns to the above-described Act001.

On the other hand, in the above-described Act002, when the bar code recognition processor 102 has not recognized a bar code (NO in Act002), the processing of the erasing apparatus 10 proceeds to Act020, as described above. In Act020, the erasing apparatus 10 stores the above-described image data without performing the encryption processing, in the same manner as the above-described Act009, for example. Further, in Act021, the erasing apparatus 10 executes the erasing processing in the same manner as the above-described Act011, for example. Further, in Act022, the erasing apparatus 10 discharges the sheet S to the ordinary tray, in the same manner as the above-described Act014, for example.

The erasing apparatus 10 according to the embodiment, determines, before executing the erasing processing, execution propriety of the erasing processing, based on the erasing execution information which the attached data included in the bar code (two-dimensional bar code and so on, for example) printed on the sheet S has. Accordingly, even when a sheet requiring security management is erroneously set in the erasing apparatus 10 as the sheet S of a processing object, the erasing processing to the sheet requiring security management is prevented.

Further, the erasing apparatus 10 according to the embodiment determines execution propriety of the storage processing of the image data, based on the security level setting information of the attached data included in the bar code printed on the sheet S to be set. The erasing apparatus 10 performs the execution propriety determination of the storage processing of the image data, and thereby limits storing of the image data in the storage device of the erasing apparatus 10 or a network-connected host computer (for example, the MFP 30). Therefore, according to the erasing apparatus 10 according to the embodiment, information leakage by the hardware analysis is prevented, and it is possible to prevent erasing processing and also contribute to the improvement of security management.

Further, the erasing apparatus 10 according to the embodiment discharges the sheet S requiring security management to a prescribed confidential tray, regardless of that the erasing processing has been performed or not to the sheet S. Accordingly, a user can perform an operation such that handling is made strict for only the sheet S housed in the confidential tray.

In the above-described description, the embodiment has been described in detail in which the program for controlling the function of the erasing apparatus is previously stored in the apparatus, but the storage form of the program is not limited. For example, the above-described program may be downloaded to the erasing apparatus from a network. The above-described program may be installed into the erasing apparatus from the recording medium in which the program is stored.

As the above-described recording medium, any form may be used, if it is a recording medium, such as a CD-ROM, which can store the program and which is readable by the apparatus.

In addition, the program obtained by downloading or installing as described above may be one which cooperates with the OS (Operating System) and so on inside the apparatus, to realize the function of the erasing apparatus.

As described above in detail, according to the erasing apparatus according to the embodiment, a user can reuse safely and effectively a sheet requiring security management.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An erasing apparatus comprising:

a scanner configured to scan a sheet and output image data of the sheet;

a heat source configured to perform a decoloring processing to decolor an image formed with decolorable material on a sheet by applying heat and pressure to the sheet;

a plurality of sheet discharge trays which house the sheet after scan processing by the scanner, or the sheet after the decoloring processing by the heat source; and a processor configured to:

acquire attribute data of the sheet from the image data output by the scanner, the attribute data including encryption information indicating whether the image data output by the scanner is required to be encrypted, determine whether the sheet requires encryption processing based on the encryption information, when the sheet is determined to require the encryption processing, encrypt the image data and control a storage unit to store the encrypted image data, determine whether the sheet requires security management based on the attribute data, when the sheet that has been subject to the decoloring processing is determined to require the security management, control a sorting processing to discharge the sheet to a prescribed sheet discharge tray out of the plurality of sheet discharge trays, and when the sheet that has not been subject to the decoloring processing is determined to require the security management, control the sorting processing to discharge the sheet to the prescribed discharge tray.

2. The erasing apparatus according to claim 1, wherein the processor detects a machine-readable mark included in the image data output from the scanner, and decodes the detected mark to acquire the attribute data.

3. The erasing apparatus according to claim 1, wherein the processor is further configured to determine whether to execute the decoloring processing on the sheet based on the attribute data.

4. The erasing apparatus according to claim 1, wherein the processor is further configured to determine, based on the attribute data, whether to execute a storage processing in which the storage unit stores the image data output from the scanner.

5. The erasing apparatus according to claim 1, wherein the processor is further configured to:

determine a security level of the sheet based on the attribute data, the security level being determined from a plurality of security level values, and control a security management of the sheet based on the determined security level of the sheet.

6. The erasing apparatus according to claim 5, wherein the processor is further configured to:

determine whether to execute the decoloring processing based on the determined security level;

determine whether or not to discharge the sheet to the prescribed sheet discharge tray based on the determined security level; and determine whether to perform the storage processing based on the determined security level.

7. The erasing apparatus according to claim 6, wherein:

when the determined security level is a highest security level value among the plurality of security level values, the processor determines to not execute the decoloring processing, determines to not execute the storage processing, and discharges the sheet to the prescribed sheet discharge tray.

8. The erasing apparatus according to claim 6, wherein;

when the determined security level is the lowest security level value, the processor controls the heat source to execute the decoloring processing, executes the storage processing, and discharges the sheet to a sheet discharge tray different from the prescribed sheet discharge tray, out of the plurality of sheet discharge trays.

9. The erasing apparatus according to claim 1, wherein:

the attribute data includes personal authentication information corresponding to a user who has formed an image on the sheet; and the processor controls the heat source to execute the decoloring processing if a user has logged in to the apparatus by inputting identification information corresponding to the personal authentication information.

10. The erasing apparatus according to claim 9, wherein:

the processor is further configured to:

set: a decoloring flag to indicate whether to execute the decoloring processing, a scan flag to indicate whether to execute the storage processing, an encryption flag to indicate whether to execute the encryption processing and a tray flag to control to what sheet discharge tray the sheet is to be discharged to out of the plurality of sheet discharge trays, and rewrite each of the flags in accordance with the attribute data.

11. The erasing apparatus according to claim 10, wherein:

the processor is further configured to determine, based on the attribute data, confidential information which indicates whether or not the sheet is a sheet on which confidential image is formed, decoloring execution information which indicates whether execution of the decoloring processing is permitted, and scan function use information which indicates whether execution of the storage processing is permitted.

12. The erasing apparatus according to claim 11, wherein the processor:

initializes a value of the tray flag based on the confidential information included in the attribute data;

initializes a value of the encryption flag based on the encryption information included in the attribute data;

initializes a value of the decoloring flag based on the decoloring execution information included in the attribute data; and initializes a value of the scan flag based on the scan function use information included in the attribute data.

13. The erasing apparatus according to claim 12, wherein:

the processor rewrites the value of the decoloring flag which has been initialized, in accordance with the personal authentication information.

14. The erasing apparatus according to claim 12, wherein:

the processor sets the value of each flag which has been initialized, in accordance with the determined security level.

15. A sheet sorting method in a decoloring apparatus having a scanner configured to output image data generated from scanning an image formed on a sheet, a heat source configured to perform a decoloring processing to decolor an image formed with decolorable coloring material on a sheet by applying heat and pressure to the sheet, and a plurality of sheet discharge trays, the method comprising:

acquiring attribute data of the sheet from the image data output by the scanner, the attribute data including encryption information;

determining whether the sheet requires encryption processing based on the encryption information indicating whether the image data output by the scanner is required to be encrypted;

when the sheet is determined to require the encryption processing, encrypting the image data and storing the encrypted image data;

determining whether the sheet requires security management based on the attribute data;

when the sheet that has been subject to the decoloring processing is determined to require the security management, discharging the sheet to a first prescribed sheet discharge tray out of the plurality of sheet discharge trays; and when the sheet that has not been subject to the decoloring processing is determined to require the security management, control the sorting processing to discharge the sheet to the prescribed discharge tray.

* * * * *